United States Patent
Zhou et al.

(10) Patent No.: US 8,980,109 B1
(45) Date of Patent: Mar. 17, 2015

(54) METHOD FOR PROVIDING A MAGNETIC RECORDING TRANSDUCER USING A COMBINED MAIN POLE AND SIDE SHIELD CMP FOR A WRAPAROUND SHIELD SCHEME

(71) Applicant: Western Digital (Fremont), LLC, Fremont, CA (US)

(72) Inventors: Ronghui Zhou, Fremont, CA (US); Lily Yao, Hayward, CA (US); Ming Jiang, San Jose, CA (US); Lien-Chang Wang, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/711,160

(22) Filed: Dec. 11, 2012

(51) Int. Cl.
*B44C 1/22* (2006.01)
*G11B 5/84* (2006.01)

(52) U.S. Cl.
CPC .......................................... *G11B 5/84* (2013.01)
USPC ...... 216/22; 216/37; 360/125.03; 360/125.02

(58) Field of Classification Search
USPC ............. 216/22, 37; 438/689, 690; 29/603.14
See application file for complete search history.

(56) References Cited

U.S. PATENT DOCUMENTS

| | | | |
|---|---|---|---|
| 4,843,023 A | 6/1989 | Chiu et al. |
| 5,498,898 A | 3/1996 | Kawamura |
| 5,640,032 A | 6/1997 | Tomioka |
| 5,672,526 A | 9/1997 | Kawamura |
| 5,898,541 A | 4/1999 | Boutaghou et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |

(Continued)

OTHER PUBLICATIONS

Xiaotian Zhou, et. al. U.S. Appl. No. 13/717,057, 16 pages. Filed Dec. 17, 2012.

*Primary Examiner* — Lan Vinh
*Assistant Examiner* — Maki Angadi

(57) ABSTRACT

A method fabricates a magnetic transducer having a nonmagnetic layer and an ABS location corresponding to an ABS. A pole trench is provided in the nonmagnetic layer. The pole trench has a pole tip region and a yoke region. At least one pole material is provided. The pole material(s) have an external protrusion that is above and external to the pole trench. A hard mask that covers at least the external protrusion is provided. A portion of the nonmagnetic layer adjacent to the pole trench is removed to form a side shield trench. At least one side shield material is provided. A portion of the side shield material(s) are adjacent to the hard mask and fill at least a portion of the side shield trench. The side shield material(s) and the pole material(s) are planarized to form at least one side shield and a main pole.

12 Claims, 13 Drawing Sheets

(56) References Cited

U.S. PATENT DOCUMENTS

| | | |
|---|---|---|
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,936 B1 | 10/2001 | Kant et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,489,177 B1 | 12/2002 | Inomoto |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |

(56) References Cited

U.S. PATENT DOCUMENTS

| | | |
|---|---|---|
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,738,231 B2 | 5/2004 | Arya et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,949,833 B2 | 9/2005 | O'Kane et al. |
| 6,950,266 B1 | 9/2005 | McCaslin et al. |
| 6,954,332 B1 | 10/2005 | Hong et al. |
| 6,954,340 B2 | 10/2005 | Shukh et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,980,403 B2 | 12/2005 | Hasegawa |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,042,682 B2 | 5/2006 | Hu et al. |
| 7,046,490 B1 | 5/2006 | Ueno et al. |
| 7,050,270 B1 | 5/2006 | Oveyssi et al. |
| 7,054,113 B1 | 5/2006 | Seagle et al. |
| 7,057,857 B1 | 6/2006 | Niu et al. |
| 7,059,868 B1 | 6/2006 | Yan |
| 7,067,066 B2 | 6/2006 | Sasaki et al. |
| 7,070,698 B2 | 7/2006 | Le |
| 7,075,756 B1 | 7/2006 | Mallary et al. |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,498 B2 | 10/2006 | Sato |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,239,479 B2 | 7/2007 | Sasaki et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,295,401 B2 | 11/2007 | Jayasekara et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,322,095 B2 | 1/2008 | Guan et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,367,112 B2 | 5/2008 | Nix et al. |
| 7,371,152 B1 | 5/2008 | Newman |
| 7,372,665 B1 | 5/2008 | Stoev et al. |
| 7,375,926 B1 | 5/2008 | Stoev et al. |

(56) References Cited

U.S. PATENT DOCUMENTS

| | | | |
|---|---|---|---|
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,525,769 B2 | 4/2009 | Yao et al. |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,565,732 B2 | 7/2009 | Le et al. |
| 7,576,951 B2 | 8/2009 | Allen et al. |
| 7,583,466 B2 | 9/2009 | Kermiche et al. |
| 7,587,811 B2 * | 9/2009 | Balamane et al. | 29/603.16 |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,158 B1 | 3/2010 | Lauer |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,898,773 B2 | 3/2011 | Han et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,978,438 B2 | 7/2011 | Ohta et al. |
| 7,982,989 B1 | 7/2011 | Shi et al. |
| 8,000,059 B2 | 8/2011 | Jiang et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,051,552 B2 | 11/2011 | Jiang et al. |
| 8,065,787 B2 | 11/2011 | Sasaki et al. |
| 8,066,892 B2 | 11/2011 | Guthrie et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,120,874 B2 | 2/2012 | Hsiao et al. |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,137,570 B2 | 3/2012 | Le |
| 8,141,235 B1 | 3/2012 | Zhang |
| 8,146,236 B1 | 4/2012 | Luo et al. |
| 8,149,536 B1 | 4/2012 | Yang et al. |
| 8,149,537 B2 | 4/2012 | Nazarov |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 * | 5/2012 | Tran et al. | 29/603.14 |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,201,320 B2 | 6/2012 | Allen et al. |
| 8,201,321 B2 | 6/2012 | Matono et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,252,190 B2 | 8/2012 | Pentek et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,562 B2 | 10/2012 | Gao et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,300,359 B2 | 10/2012 | Hirata et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |

(56) References Cited

U.S. PATENT DOCUMENTS

| | | |
|---|---|---|
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,349,197 B2 | 1/2013 | Hong et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,400,733 B2 | 3/2013 | Shin et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,660 B2 | 10/2013 | Allen et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,879,207 B1 | 11/2014 | Zhang et al. |
| 2002/0071208 A1 | 6/2002 | Batra et al. |
| 2005/0057852 A1 | 3/2005 | Yazawa et al. |

(56) References Cited

U.S. PATENT DOCUMENTS

| | | |
|---|---|---|
| 2005/0068669 A1 | 3/2005 | Hsu et al. |
| 2005/0128637 A1 | 6/2005 | Johnston et al. |
| 2006/0044681 A1 | 3/2006 | Le et al. |
| 2006/0044682 A1 | 3/2006 | Le et al. |
| 2006/0082924 A1 | 4/2006 | Etoh et al. |
| 2006/0198049 A1 | 9/2006 | Sasaki et al. |
| 2007/0035878 A1 | 2/2007 | Guthrie et al. |
| 2007/0035885 A1 | 2/2007 | Im et al. |
| 2007/0115584 A1 | 5/2007 | Balamane et al. |
| 2007/0146929 A1 | 6/2007 | Maruyama et al. |
| 2007/0146931 A1 | 6/2007 | Baer et al. |
| 2007/0177301 A1 | 8/2007 | Han et al. |
| 2007/0186408 A1 | 8/2007 | Nix et al. |
| 2007/0211384 A1 | 9/2007 | Hsiao et al. |
| 2007/0217069 A1 | 9/2007 | Okada et al. |
| 2007/0223144 A1 | 9/2007 | Yao et al. |
| 2007/0245545 A1 | 10/2007 | Pentek et al. |
| 2007/0253107 A1 | 11/2007 | Mochizuki et al. |
| 2007/0268626 A1 | 11/2007 | Taguchi et al. |
| 2008/0100959 A1 | 5/2008 | Feldbaum et al. |
| 2008/0110761 A1 | 5/2008 | Lam et al. |
| 2008/0113090 A1 | 5/2008 | Lam et al. |
| 2008/0148552 A1 | 6/2008 | Pentek et al. |
| 2008/0278861 A1 | 11/2008 | Jiang et al. |
| 2008/0297945 A1 | 12/2008 | Han et al. |
| 2008/0313885 A1 | 12/2008 | Hsiao et al. |
| 2009/0002885 A1 | 1/2009 | Sin |
| 2009/0034128 A1 | 2/2009 | Sharma et al. |
| 2009/0116145 A1 | 5/2009 | Guan et al. |
| 2009/0128952 A1 | 5/2009 | Sato et al. |
| 2009/0128953 A1 | 5/2009 | Jiang et al. |
| 2009/0168236 A1 | 7/2009 | Jiang et al. |
| 2009/0168242 A1 | 7/2009 | Liu |
| 2009/0184091 A1 | 7/2009 | Zheng |
| 2009/0195920 A1 | 8/2009 | Bonhote et al. |
| 2010/0155364 A1 | 6/2010 | Pentek et al. |
| 2010/0155367 A1 | 6/2010 | Pentek et al. |
| 2010/0290157 A1 | 11/2010 | Zhang et al. |
| 2011/0086240 A1 | 4/2011 | Xiang et al. |
| 2011/0097601 A1 | 4/2011 | Bai et al. |
| 2011/0120878 A1 | 5/2011 | Hong et al. |
| 2011/0147222 A1 | 6/2011 | Pentek et al. |
| 2011/0228425 A1 | 9/2011 | Liu et al. |
| 2011/0255196 A1 | 10/2011 | Wu et al. |
| 2012/0111826 A1 | 5/2012 | Chen et al. |
| 2012/0125886 A1 | 5/2012 | Hong et al. |
| 2012/0127612 A1 | 5/2012 | Shin et al. |
| 2012/0140358 A1 | 6/2012 | Sasaki et al. |
| 2012/0147499 A1 | 6/2012 | Sasaki et al. |
| 2012/0147501 A1 | 6/2012 | Sasaki et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2012/0304454 A1 | 12/2012 | Jiang et al. |
| 2013/0022841 A1 | 1/2013 | Gao et al. |
| 2013/0216702 A1 | 8/2013 | Kaiser et al. |
| 2013/0216863 A1 | 8/2013 | Li et al. |
| 2013/0242431 A1 | 9/2013 | Hosomi et al. |
| 2013/0257421 A1 | 10/2013 | Shang et al. |
| 2014/0063657 A1 | 3/2014 | Gao et al. |
| 2014/0154529 A1 | 6/2014 | Yang et al. |
| 2014/0175050 A1 | 6/2014 | Zhang et al. |

* cited by examiner

METHOD FOR PROVIDING A MAGNETIC RECORDING TRANSDUCER USING A COMBINED MAIN POLE AND SIDE SHIELD CMP FOR A WRAPAROUND SHIELD SCHEME

BACKGROUND

FIG. 1 is a flow chart depicting a conventional method 10 for fabricating for a conventional magnetic recording transducer including side shields. For simplicity, some steps are omitted. Prior to the conventional method 10 starting, underlayers such as a leading shield may be formed. The conventional method 10 typically starts by building up material for a pole, such as a perpendicular magnetic recording (PMR) pole, via step 12. Step 12 includes forming a trench in a nonmagnetic layer, such as aluminum oxide. Nonmagnetic side gap/seed layers and magnetic pole layers may also be provided. For example, a Ru seed layer may be deposited and a high saturation magnetization pole layers may be plated. In addition, a portion of the magnetic pole material may be masked. The portion of the magnetic pole material in the field region may be removed using a wet etch and a nonmagnetic layer deposited, via step 14. Thus, only the magnetic material in the pole region remains. The main pole then undergoes a chemical mechanical planarization (CMP) process. The CMP removes the portion of the pole material external to the trench in the nonmagnetic layer.

An α-carbon hard mask is provided for the pole, via step 18. The exposed aluminum oxide nonmagnetic layer is wet etched, via step 20. The α-carbon hard mask provided in step 18 protects the pole during the wet etch in of step 20. Thus, a trench is formed around a portion of the pole near the ABS location. The side shields are then provided by refilling at least part of the region opened by the wet etch in step 20, via step 22. The side shield undergoes its own, separate CMP, via step 24. Processing may then be completed. For example, the α-carbon hard mask is removed and a trailing edge shield and gap may be formed.

FIG. 2 depicts plan and air-bearing surface (ABS) views of a portion of a conventional transducer 50 formed using the conventional method 10. The conventional transducer 50 includes a leading shield 52, side shields 54, Ru side gap layer 56 which is deposited in the trench, a pole 58, top gap layer 60, and trailing shield 62. Thus, using the conventional method 10, the pole 58, side shields 54, and trailing shield 62 may be formed.

Although the conventional method 10 may provide the conventional transducer 50, there may be drawbacks. Formation of the conventional transducer 50 may involve numerous steps, some of which may be complex. As a result, fabrication of the conventional transducer may take a longer time than desired to complete. In addition, more complicated processing may be more error-prone. The performance of the conventional transducer 50 may thus be compromised. Further, the materials around the α-carbon mask (not shown in FIG. 2) may polish at different rates. Thus, the flatness of the pole 58 and side shields 54 may be less than desired. This may be seen in FIG. 2 in which a portion of the side shields 54 is higher than the top of the pole 58, while another portion is lower than the tip of the pole. The removal of the α-carbon hard mask may also introduce issues. The α-carbon residue may accumulate at the corners of the pole 58 during removal. These residues may introduce asymmetries in the transducer 50 and adversely affect downstream processing. These and other issues may adversely affect performance of the conventional magnetic transducer 50.

Accordingly, what is needed is an improved method for fabricating a transducer.

SUMMARY

A method fabricates a magnetic transducer having a nonmagnetic layer and an ABS location corresponding to an ABS. A pole trench is provided in the nonmagnetic layer. The pole trench has a pole tip region and a yoke region. At least one pole material is provided. After removal of the pole material(s) in the field, the remaining pole material(s) form an external protrusion that is above and outside of the pole trench. A hard mask that covers at least the external protrusion is provided. A portion of the nonmagnetic layer adjacent to the pole trench is removed to form a side shield trench. At least one side shield material is provided. A portion of the side shield material(s) are adjacent to the hard mask and fill at least part of the side shield trench. The side shield material(s) and the pole material(s) are planarized to form side shield(s) and a main pole.

DETAILED DESCRIPTION OF THE PREFERRED EMBODIMENTS

Figure 1:
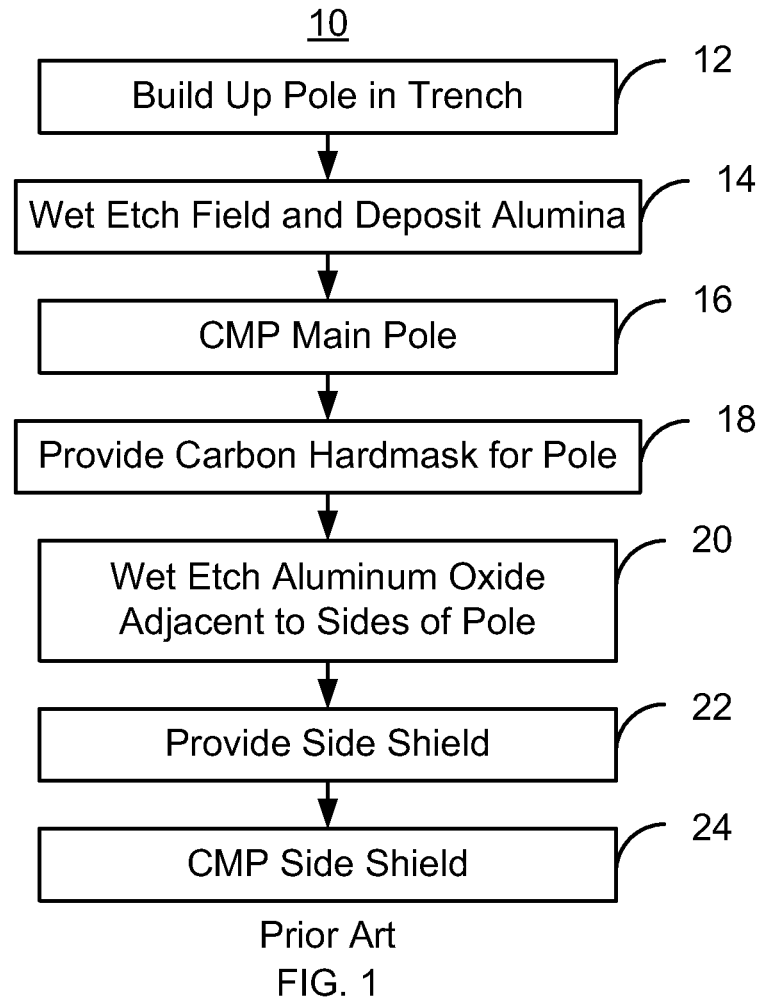
FIG. 1 is a flow chart depicting a conventional method for fabricating a magnetic recording transducer.
Figure 2:
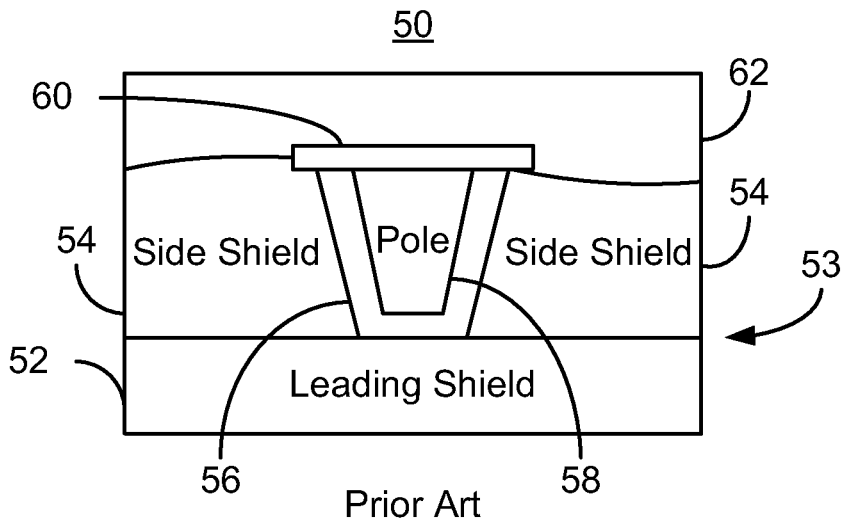
FIG. 2 is a diagram depicting an ABS view of a conventional magnetic transducer.
Figure 3:
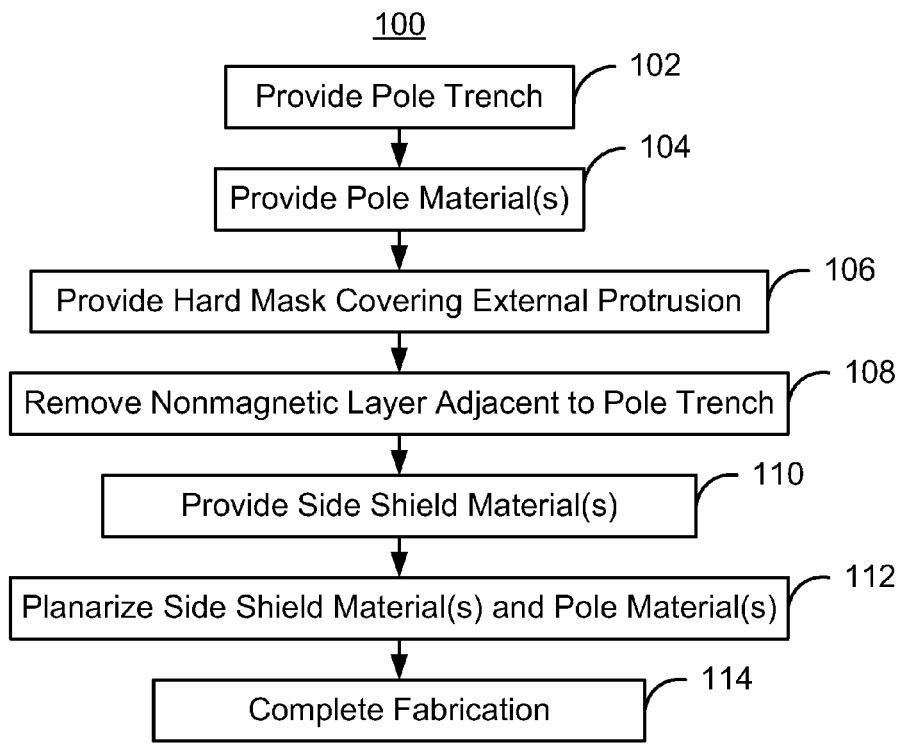
FIG. 3 is a flow chart depicting an exemplary embodiment of a method for fabricating a magnetic recording transducer including side shields.

FIG. 3 is a flow chart depicting an exemplary embodiment of a method 100 for fabricating a transducer. The method 100 may be used in fabricating transducers such as PMR or heat assisted magnetic recording (HAMR) transducers, though other transducers might be so fabricated. For simplicity, some steps may be omitted, performed in another order, and/or combined. The magnetic recording transducer being fabricated may be part of a merged head that also includes a read head (not shown) and resides on a slider (not shown) in a disk drive. The method 100 is also described in the context of providing a pole, a single set of shields and their associated structures in a single magnetic recording transducer. However, the method 100 may be used to fabricate multiple transducers at substantially the same time. The method 100 and system are also described in the context of particular layers. However, in some embodiments, such layers may include multiple sub-layers. The method 100 also may commence after formation of other portions of the transducer. For example, the method 100 starts after the leading shield has been provided and a nonmagnetic layer has been provided on the leading shield.

A pole trench is provided in the nonmagnetic layer, via step 102. The pole trench has a pole tip region proximate to the ABS location and a yoke region. The ABS location corresponds to the location of the ABS after fabrication of the transducer is completed. The pole material(s) are provided, via step 104. The pole material(s) include or consist of high saturation magnetization material such as CoFe. Such materials may be plated or provided in another manner. In addition, a nonmagnetic seed and/or gap layer(s) may be provided. For example, a Ru layer may be deposited in the trench. The magnetic pole material(s) may be deposited with a mask in place. Alternatively, the pole materials may be grown as a full film, and then a portion outside of the pole region removed. For example, a mask that covers the region above the pole trench and exposes a portion of the pole material(s) may be provided, and the exposed portion of the pole material(s) removed. However, an external protrusion of pole material(s) remains. This external protrusion resides above and external to the pole trench.

A hard mask is provided, via step 106. The hard mask covers at least the external protrusion of the pole materials. The hard mask may be a metal, such as Ru. Step 106 may include full film depositing a hard mask layer, providing a mask that covers the portion of the hard mask layer on the external protrusion, and then removing the exposed portion of the hard mask layer. In an alternate embodiment, a mask exposing the external protrusion may be provided, the material(s) for the hard mask may be deposited, and then the mask may be removed. Thus, the magnetic materials for the pole are surrounded by a combination of seed and/or gap layers in the pole trench and the hard mask above the pole trench.

A portion of the nonmagnetic layer adjacent to the pole is removed, via step 106. In some embodiments, step 106 is performed by providing a mask having an aperture above the desired portion of the nonmagnetic layer and performing a wet etch. The portion of the nonmagnetic material removed forms a side shield trench adjacent to the pole and in which side shields may be formed.

Side shield material(s) are provided, via step 110. Step 110 may include depositing a seed layer and plating high permeability materials, such as NiFe, for the side shields. At least part of the side shield material(s) fills the side shield trench. In some embodiments, a portion of the side shield material(s) also covers the hard mask and, therefore, the pole material(s).

Both the side shield material(s) and the pole material(s) are planarized, via step 112. In some embodiments, a dielectric layer that covers both the side shield material(s) and the external protrusion of the pole materials may be provided prior to the planarization step. The planarization performed in step 112 may be a chemical mechanical planarization (CMP). Thus, the external protrusion of the pole material(s) is removed. The side shield(s) and main pole are thus formed. Fabrication of the transducer is then completed, via step 114. For example, some additional milling of the pole and/or side shields may be performed. A write gap and trailing shield may also be fabricated.

Figure 4:
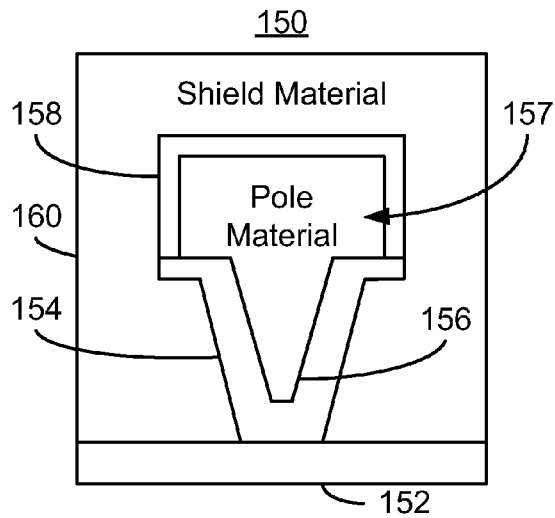
FIG. 4 is a diagram depicting an exemplary embodiment of a magnetic transducer having side shields during fabrication.
Figure 5:
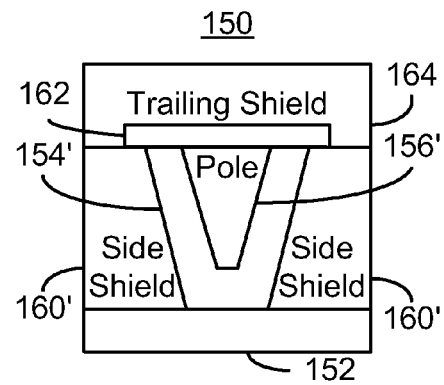
FIG. 5 is diagram depicting an exemplary embodiment of a magnetic transducer having side shields after fabrication of the pole and side shields is completed.

FIGS. 4 and 5 depict an exemplary embodiment of a magnetic transducer 150, otherwise termed a writer, during after formation using the method 100. For clarity, FIGS. 4 and 5 are not to scale. FIG. 4 depicts an ABS view of the transducer 150 before the planarization in step 112. The magnetic transducer 150 includes an underlayer 152, which may be a leading shield. As can be seen in FIG. 4, a gap/seed layer 154 and pole material(s) 156 have been provided. A hard mask 158 and side shield material(s) 160 have also been formed. Because the planarization step 112 has not yet been performed, an external protrusion 157 of the pole materials remains above the location of the pole trench.

FIG. 5 depicts the transducer 150 after step 112 has been performed. Write gap 162 and trailing shield 164 have also been fabricated. The write gap 162 is nonmagnetic and may be an insulator such as alumina. The trailing shield 164 may be a high permeability material such as NiFe. Because the planarization step 112 has been completed, the external protrusion 157 is removed. Thus, the main pole 156' and side shields 160' remain. In the embodiment shown, a portion of the nonmagnetic gap layer has been removed, leaving layer 154'.

Using the method 100, the transducer 150 having side shields 160' and pole 156' may be formed. Only a single planarization is used in forming both the pole 156' and the side shields 160'. This may be accomplished without introducing additional photoresist masks and critical dimensions. Thus, processing may be greatly simplified and may require significantly less time. In addition, a single CMP for both the pole 156' and side shields 160' may reduce variations in the heights of the pole 156' and side shields 160'. Performance of the transducer 150 may thus be improved. Because a single planarization is used for both the pole 156' and shields 160', the materials consumed during fabrication may also be reduced. The transducer 150 may cost less. Further, use of the hard mask 1158 may obviate the need for a mask such as the α-carbon mask. Related issues such as asymmetries in the pole geometry and problems with downstream processing may be reduced or avoided. Thus, performance and fabrication of the transducer 150 may be enhanced.

Figure 6:
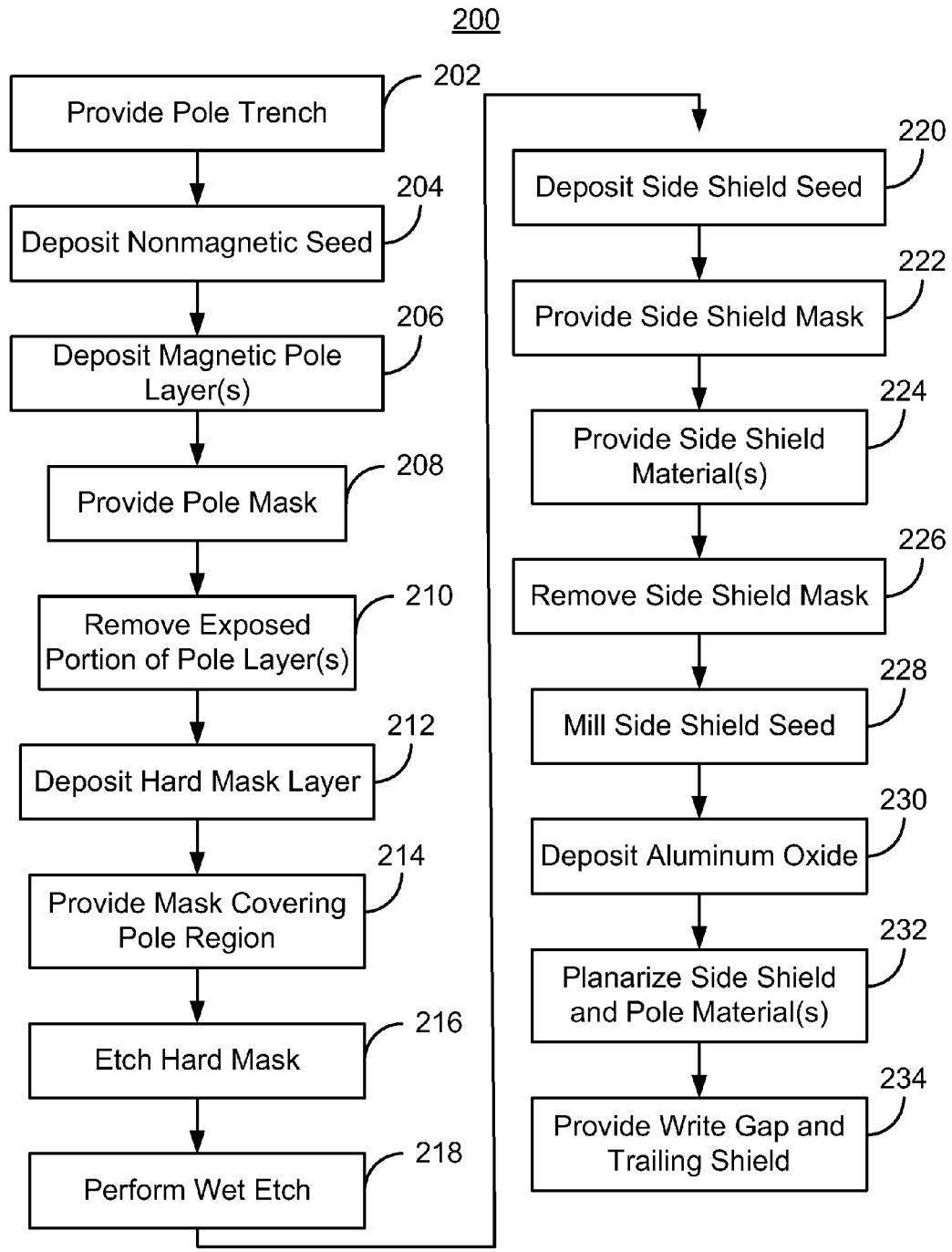
FIG. 6 is a flow chart depicting another exemplary embodiment of a method for fabricating side shields for a magnetic recording transducer.

FIG. 6 is a flow chart depicting another exemplary embodiment of a method 200 for fabricating a write transducer. For simplicity, some steps may be omitted, interleaved, and/or combined. FIGS. 7-25 are diagrams various views of an exemplary embodiment of a portion of a transducer during 250 fabrication. For clarity, FIGS. 7-25 are not to scale. Referring to FIGS. 6-25, the method 200 is described in the context of the transducer 250. However, the method 200 may be used to form another device (not shown). The transducer 250 being fabricated may be part of a merged head that also includes a read head (not shown in FIGS. 7-25) and resides on a slider (not shown) in a disk drive. The method 200 also may commence after formation of other portions of the transducer 250. For example, the method 200 starts after formation of a leading shield (if any) and a nonmagnetic layer in which the pole is to be formed. The method 200 is also described in the context of providing a single transducer 250. However, the method 200 may be used to fabricate multiple transducers at substantially the same time. The method 200 and device 250 are also described in the context of particular layers. However, in some embodiments, such layers may include multiple sublayers.

A pole trench is provided in the nonmagnetic layer, via step 202. This may be accomplished by reactive ion etching the nonmagnetic layer. For example, if the nonmagnetic layer is formed of aluminum oxide, then step 202 may include performing a reactive ion etch with an aluminum oxide etch chemistry. The pole trench has a pole tip region proximate to the ABS location and a yoke region. The pole tip region is between the ABS location and the yoke region. The ABS location is the location at which the ABS is formed during fabrication.

Figure 7:
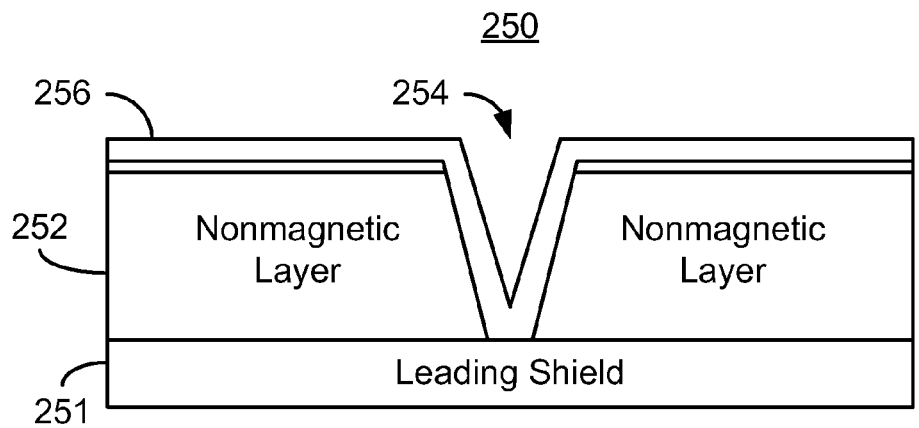
FIGS. 7-25 are diagrams various views an exemplary embodiment of a magnetic recording transducer during fabrication.

A nonmagnetic seed layer is full filmed deposited, via step 204. In some embodiments, step 204 includes depositing a single nonmagnetic layer. In other embodiments, multiple sublayers may be used. In some embodiments, the nonmagnetic seed layer is Ru that may have been deposited using chemical vapor deposition (CVD). Thus, the nonmagnetic seed layer has substantially uniform thickness. FIG. 7 depicts an ABS view of the transducer 250 after step 204 has been performed. A leading shield 251 and nonmagnetic layer 252 are shown. A pole trench 254 has been formed in the nonmagnetic layer 252. Also shown is the nonmagnetic seed layer 256. A portion of the nonmagnetic seed layer 256 is within the pole trench 254. The nonmagnetic seed layer 256 may also function as a side gap layer. In the embodiment shown, the pole trench 254 is trapezoidal. However, because the nonmagnetic seed layer 256 has been deposited, the remaining portion of the pole trench 254 is triangular in cross-section. In other embodiments, the pole trench 254 and/or the unfilled remaining portion of the pole trench 254 may have another shape.

Figure 8:
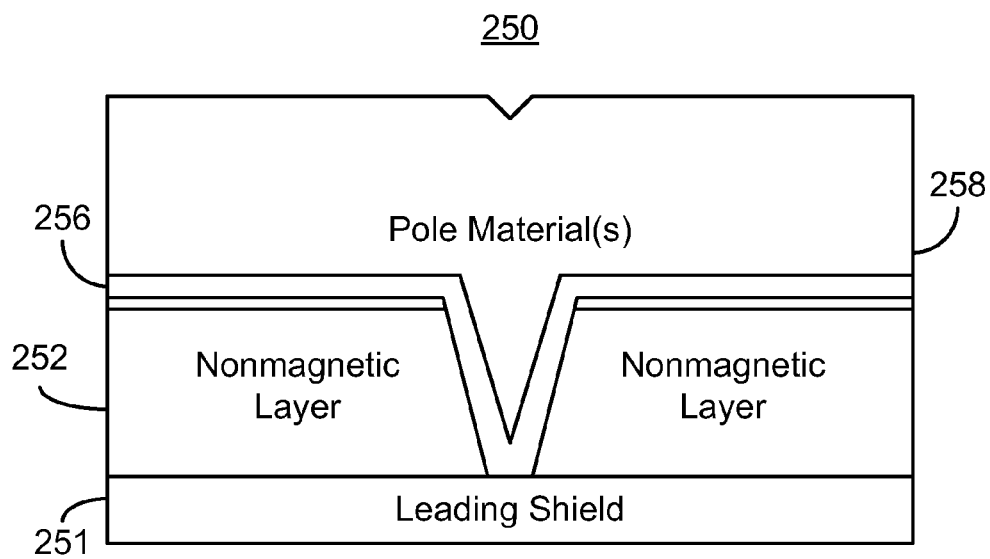

At least one magnetic pole layer is full film deposited, via step 206. In some embodiments, step 206 includes plating a high saturation magnetization material, such as CoFe. In other embodiments, step 206 may be performed using sputtering or other deposition techniques and may use additional and/or different materials. FIG. 8 depicts an ABS view of the transducer 250 after step 206 has been performed. Thus, pole material(s) 258 are shown. A portion of the pole material(s) reside in the pole trench 254 (not labeled in FIGS. 8-25 for simplicity), while another portion of the pole material(s) 258 are external to the pole trench 254.

Figure 9:
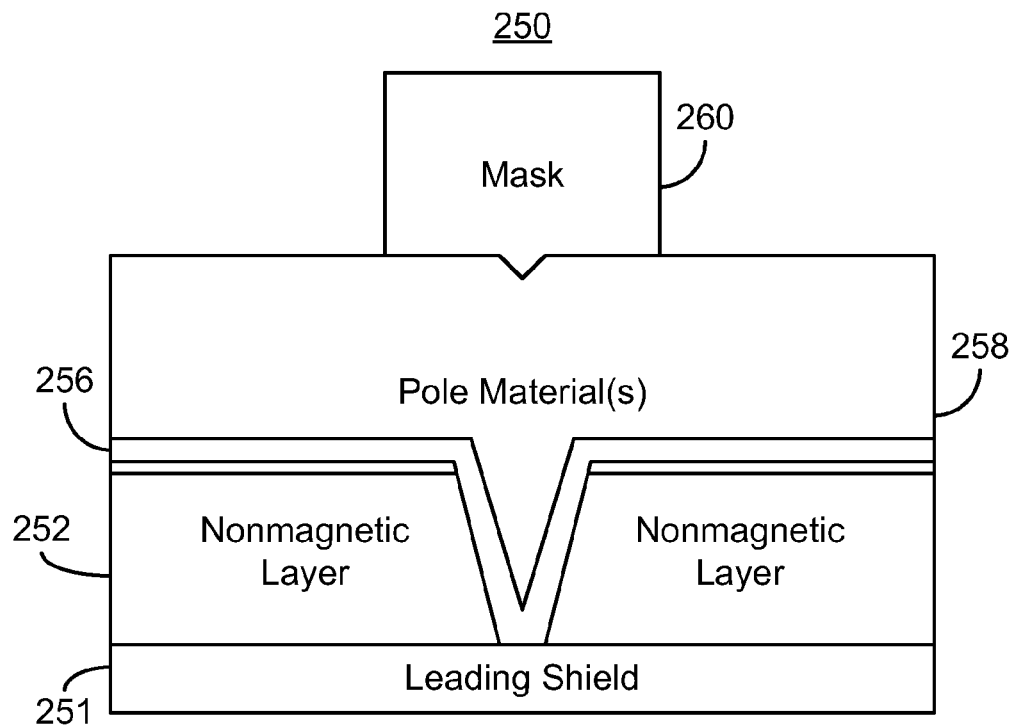
Figure 10:
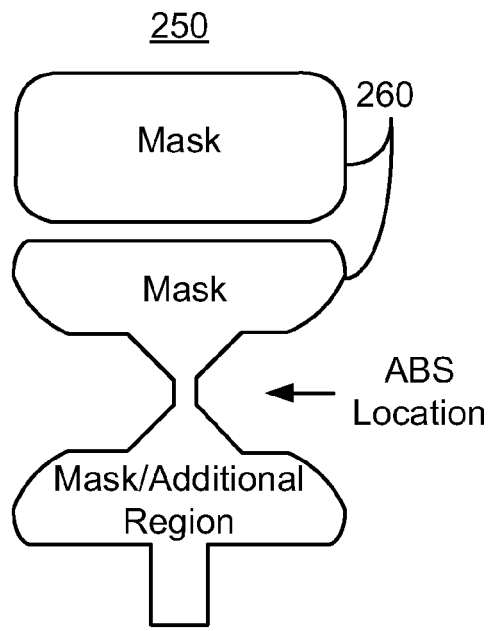

A pole mask is formed, via step 208. In some embodiments, the pole mask is a photoresist mask that covers the region above the pole trench 254. FIGS. 9 and 10 depict ABS and plan views, respectively, of the transducer 250 after step 208 is performed. Thus, photoresist mask 260 is shown. The pole mask 260 covers at least the portion of the pole material (s) 250 above and around the pole trench 254. The remaining portion of the pole material(s) 258 is exposed.

Figure 11:
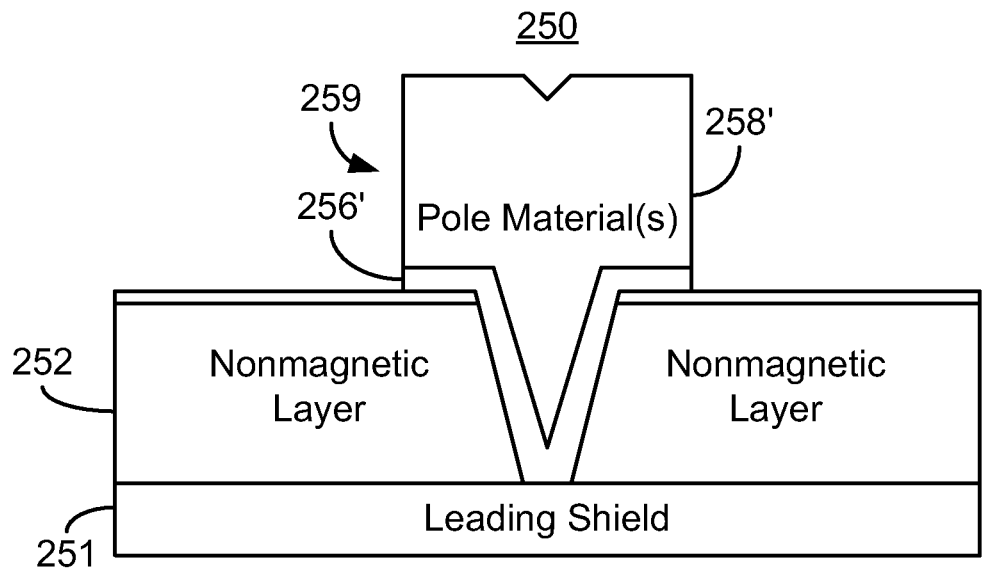

The exposed portion of the pole material(s) 258 are removed, via step 210. As part of step 210, the photoresist mask 260 may also be stripped. FIG. 11 depicts an ABS view of the transducer 250 after step 210 is performed. Thus, only pole material(s) 258' remain. The remaining pole material(s) 258' has an external protrusion 259 above and external to the pole trench 254

Figure 12:
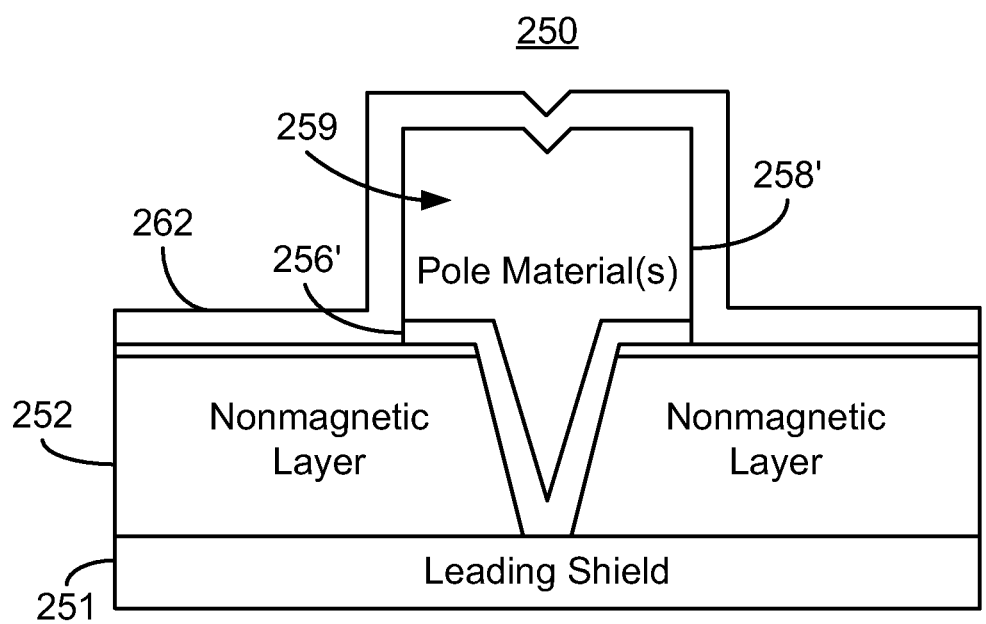

A hard mask layer is full film deposited, via step 212. In some embodiments, step 212 includes depositing a material such as Ru. FIG. 12 depicts an ABS view of the transducer 250 after step 212 is performed. Thus, hard mask layer 262 is shown. A portion of the hard mask layer 262 covers the external protrusion 257.

Figure 13:
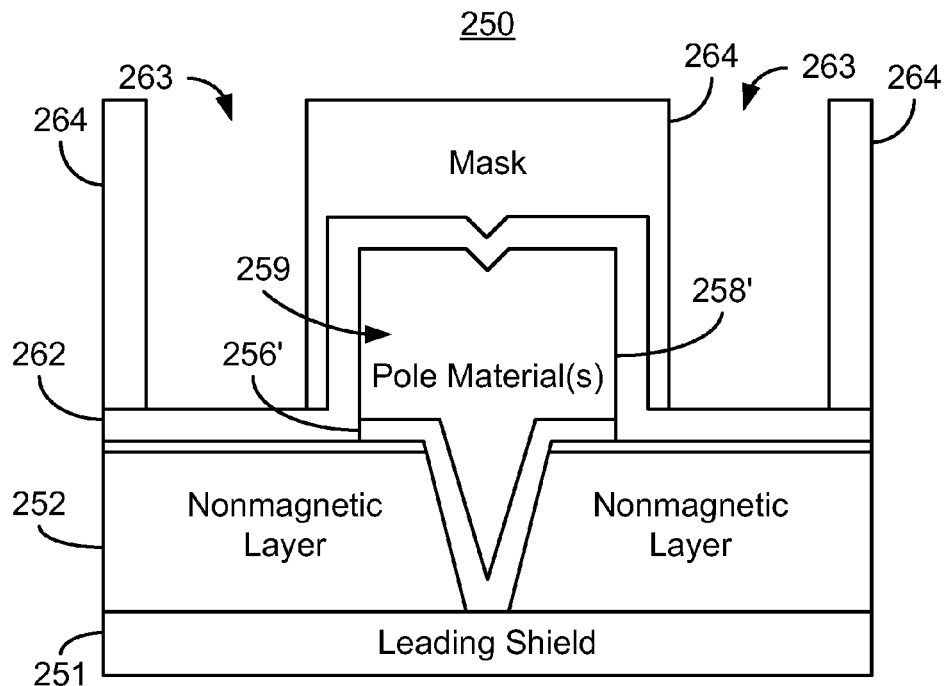
Figure 14:
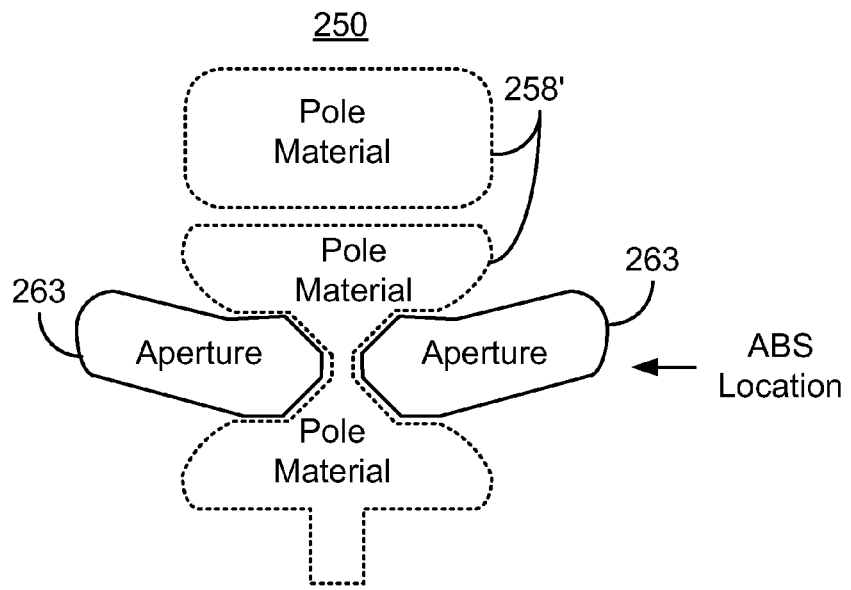

A portion of the nonmagnetic layer 252 underlying part of the hard mask layer 262 is desired to be removed in order to fabricate the side shields. Thus, a mask that covers a desired portion of the hard mask layer 262 is provided, via step 214. In some embodiments, the mask provided in step 214 is a photoresist mask. The pole material(s) 258' are covered by the mask. In addition, regions of the transducer in which the nonmagnetic layer 252 is not desired to be removed are covered. FIGS. 13 and 14 depict ABS and plan views, respectively, of the transducer 250 after step 214 is performed. Thus, mask 264 is shown. The mask 264 has apertures 263 that correspond to the side shields. Note that the underlying pole material(s) 258' are shown as dashed lines in FIG. 14 as these structures are covered by the mask 264.

Figure 15:
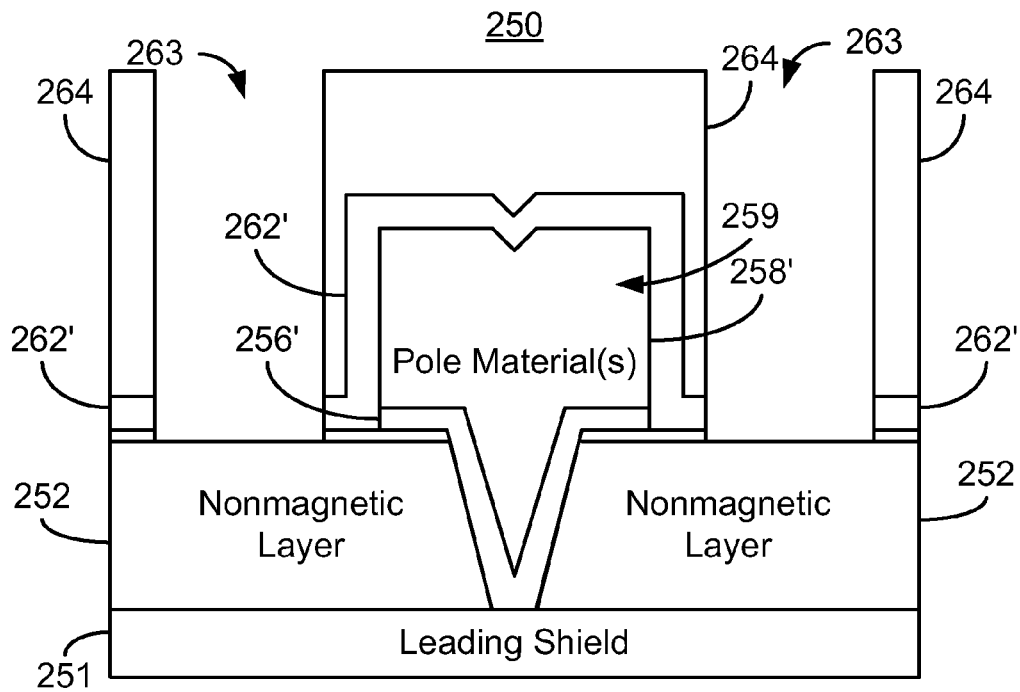

An exposed portion of the hard mask layer is removed to form a hard mask, via step 216. FIG. 15 depicts an ABS view of the transducer 250 after step 216 is performed. The hard mask 262' covers at least the external protrusion 259. Thus, the pole materials 258' are enclosed in the seed layer 256' and hard mask 262', both of which may be formed of protective material(s) such as Ru.

Figure 16:
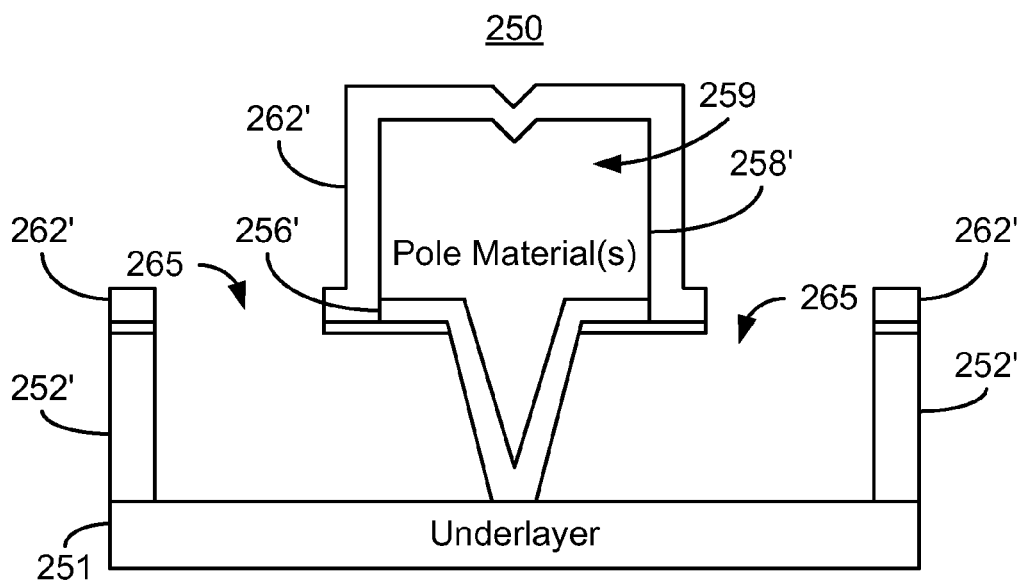

The portion of the nonmagnetic layer 252 adjacent to the pole material(s) 258' and exposed by the hard mask 262' is wet etched, via step 218. In some embodiments, the mask 264 doubles as a mask used in the wet etch of step 218. However, in other embodiments, the mask 264 may be removed and another mask may be provided. After step 218 is performed, the mask 264 may be removed. FIG. 16 depicts an ABS view of the transducer 250 after step 218 is performed. Part of the nonmagnetic layer 252 has been removed, with part of the nonmagnetic layer 252' remaining. Side shield trenches 265 have thus been formed.

Figure 17:
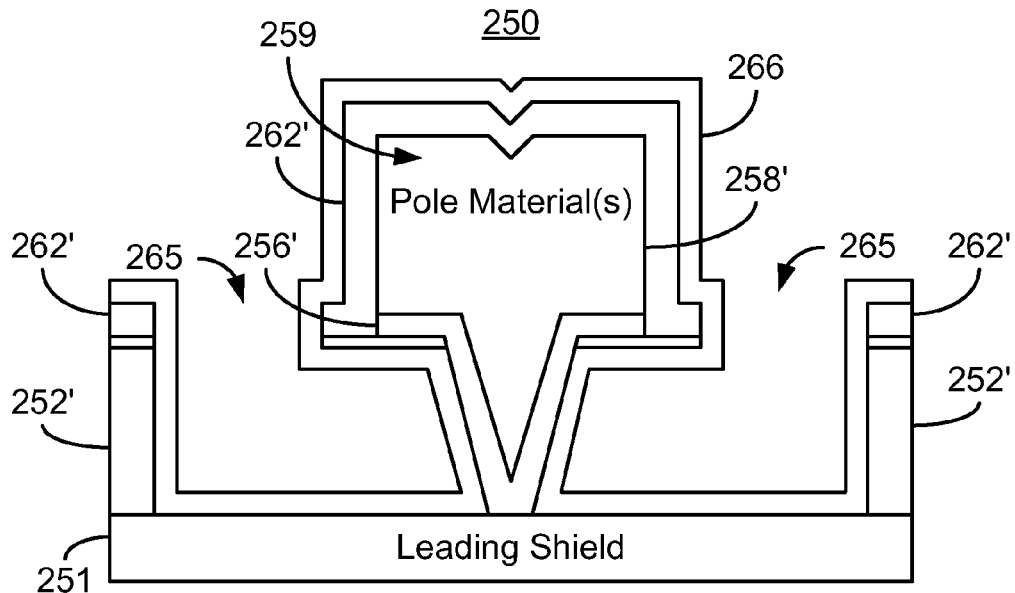
Figure 18:
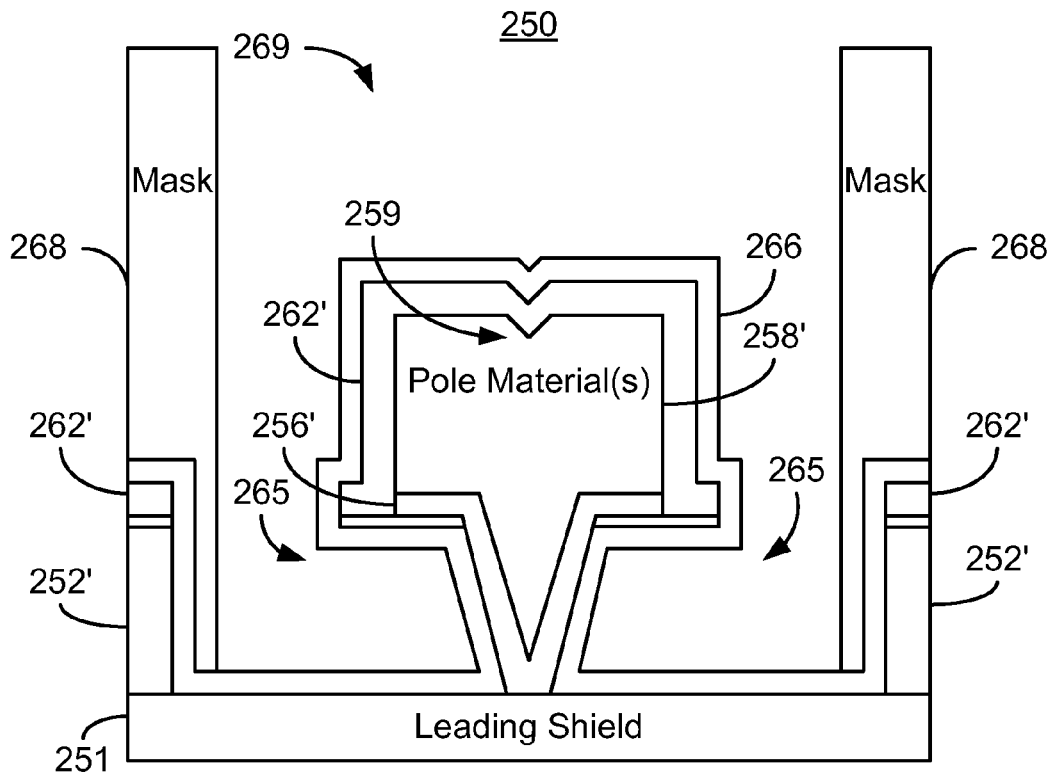
Figure 19:
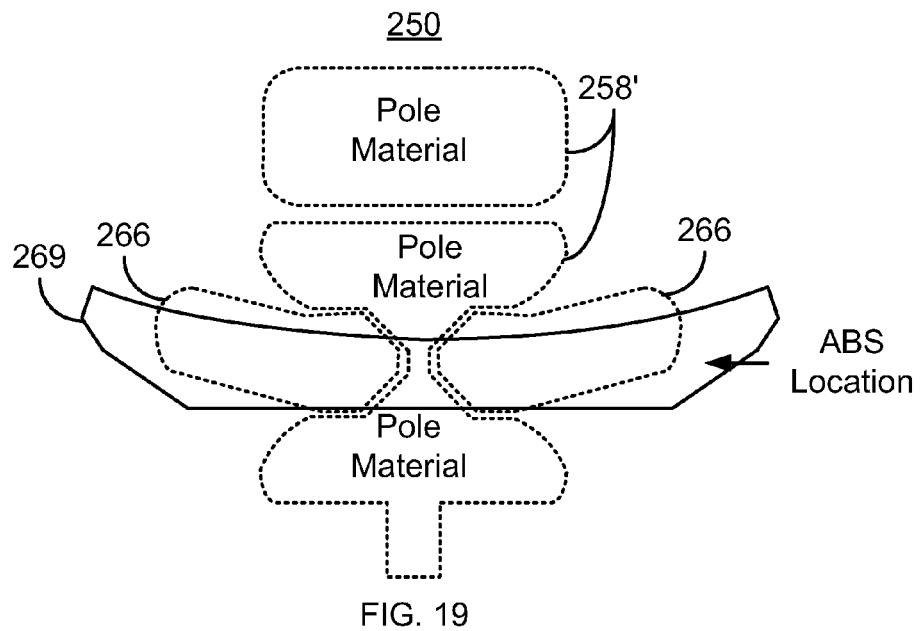
Figure 20:
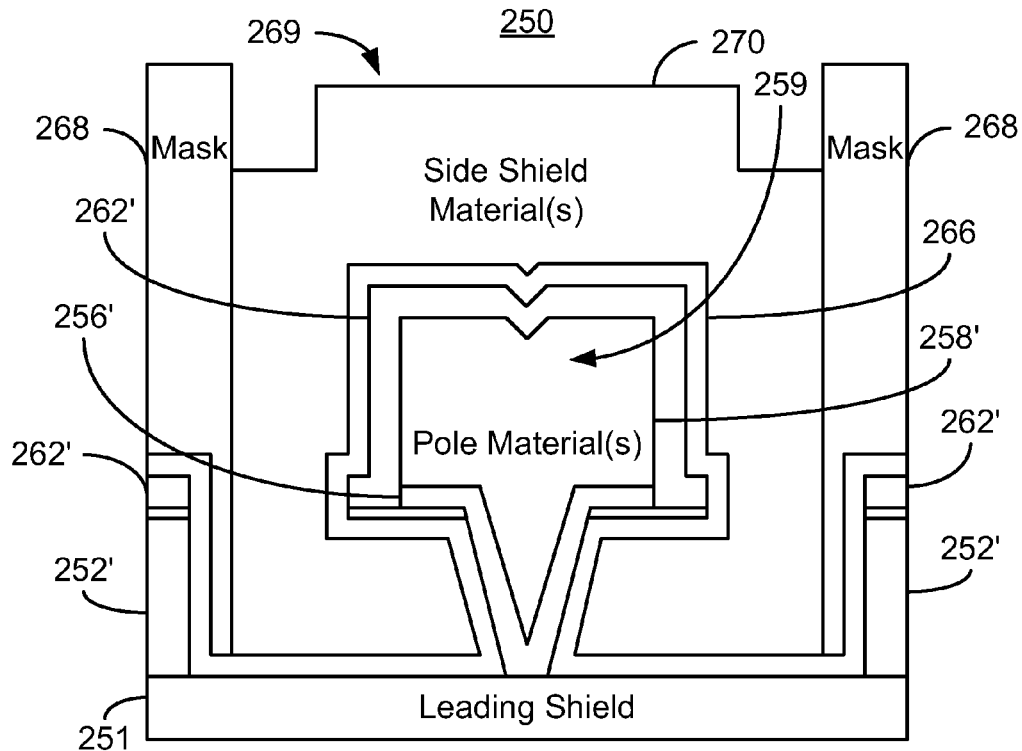

A seed layer for the side shields is full film deposited, via step 220. FIG. 17 depicts an ABS view of the transducer 250 after step 220 is performed. Thus, layer 266 is shown. A side shield mask is provided, via step 222. The side shield mask is used to control the region in which the side shield material is to be deposited. In some embodiments, the side shield mask is a photoresist mask. FIGS. 19 and 20 depict ABS and plan views of the transducer 250 after step 222 is performed. Thus, side shield mask 268 having aperture 269 is shown. The aperture 269 exposes a portion of the side shield trenches 265, the region above the pole material(s) 258', and the hard mask 262' on the pole material(s) 258'.

One or more layer(s) of material(s) are deposited for the side shields, via step 224. In some embodiments, a layer of high permeability material such as NiFe may be plated. However, in other embodiments, other material(s) and/or other deposition techniques may be used. FIG. 20 depicts an ABS view of the transducer after step 224 is performed. Thus, side shield material(s) 270 have been provided.

Figure 21:
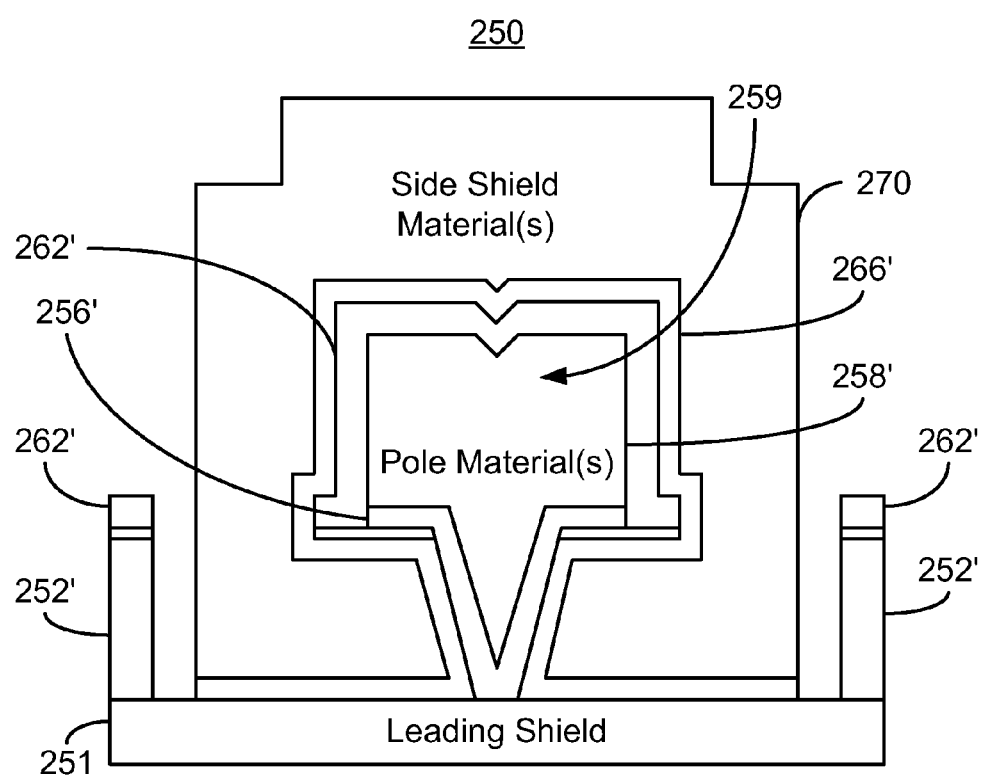

The side shield mask 268 is removed, via step 226. For example, a photoresist strip may be performed. The exposed side shield seed layer 266 may be removed, via step 228. In some embodiments, step 228 is performed by milling the side shield seed layer 266. FIG. 21 depicts an ABS view of the transducer 250 after step 228 is performed. Thus, the side shield seed layer 266' under the side shield material(s) 270 remains. However, the side shield seed layer in portions surrounding the side shield material(s) 270 has been removed.

Figure 22:
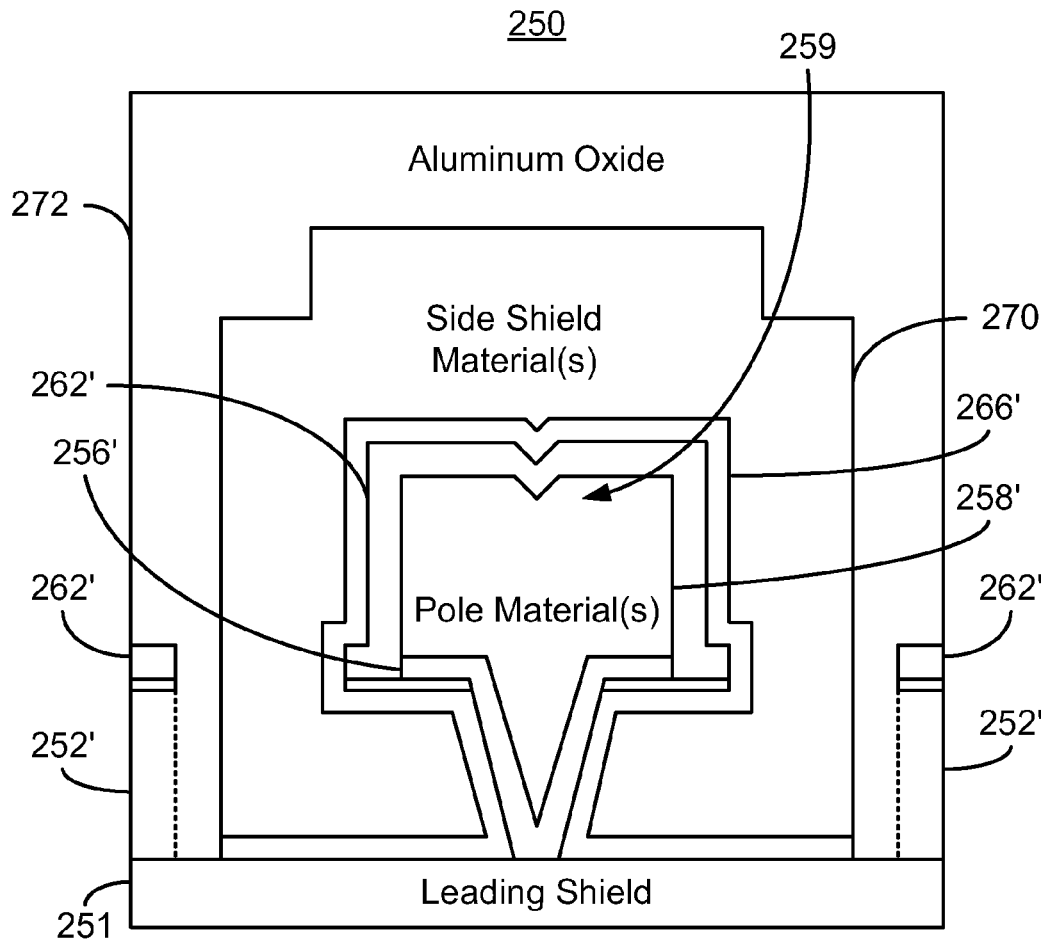

An aluminum oxide layer is deposited, via step 230. FIG. 22 depicts an ABS view of the transducer 250 after step 230 is performed. Thus, an aluminum oxide layer 272 that covers the side shield material(s) 270 has been formed.

Figure 23:
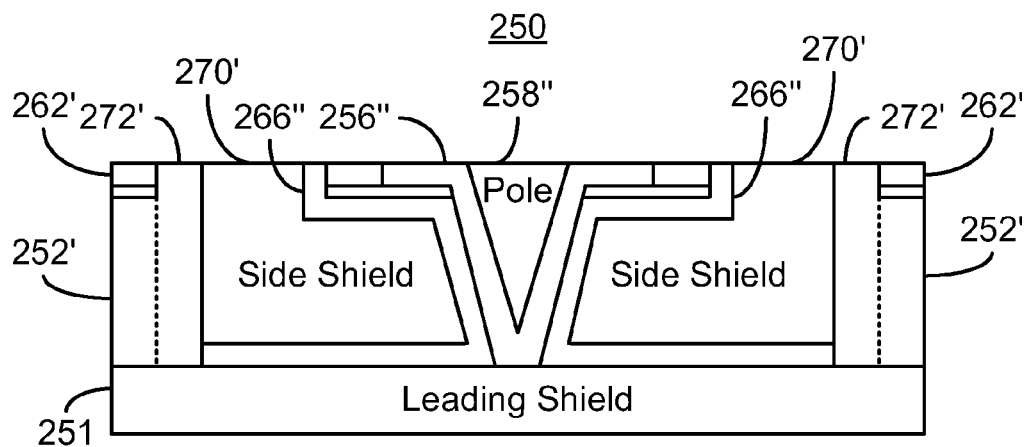

The side shield material(s) 270 and pole material(s) 258' are planarized, via step 232. Step 232 includes performing a CMP. FIG. 23 depicts an ABS view of the transducer after step 232 is performed. Thus, the external protrusion 259 has been removed. Only a portion of the pole material(s) 258" within the pole trench remains. In addition, the side shield material(s) 270' above the pole 258" have been removed. Only a portion of the side shield seed layer 266" and seed layer 256" remain. The remaining side shield material(s) 270' have a top surface that is substantially the same as the top surface of the pole 258". Thus, side shields 270' and main pole 258" have been formed.

Figure 24:
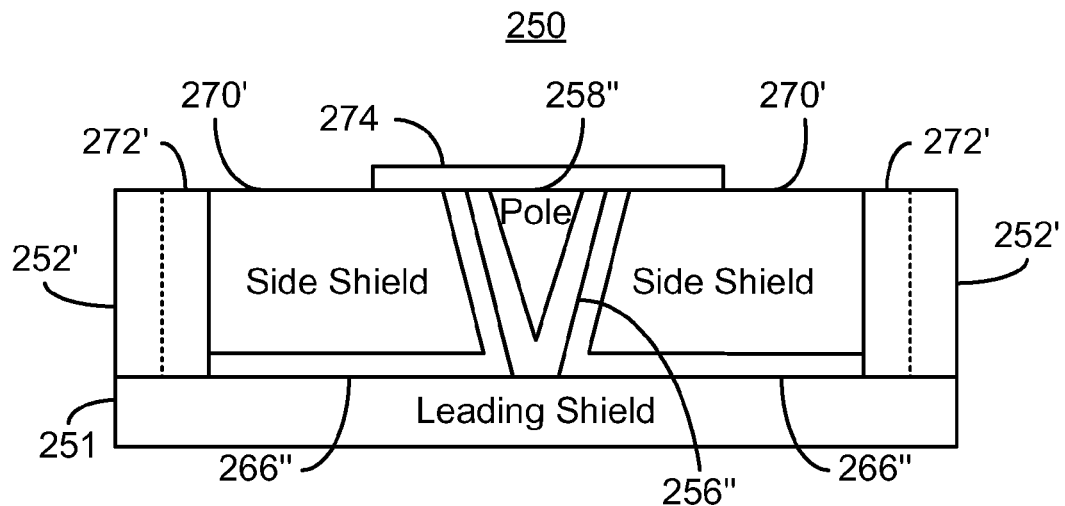
Figure 25:
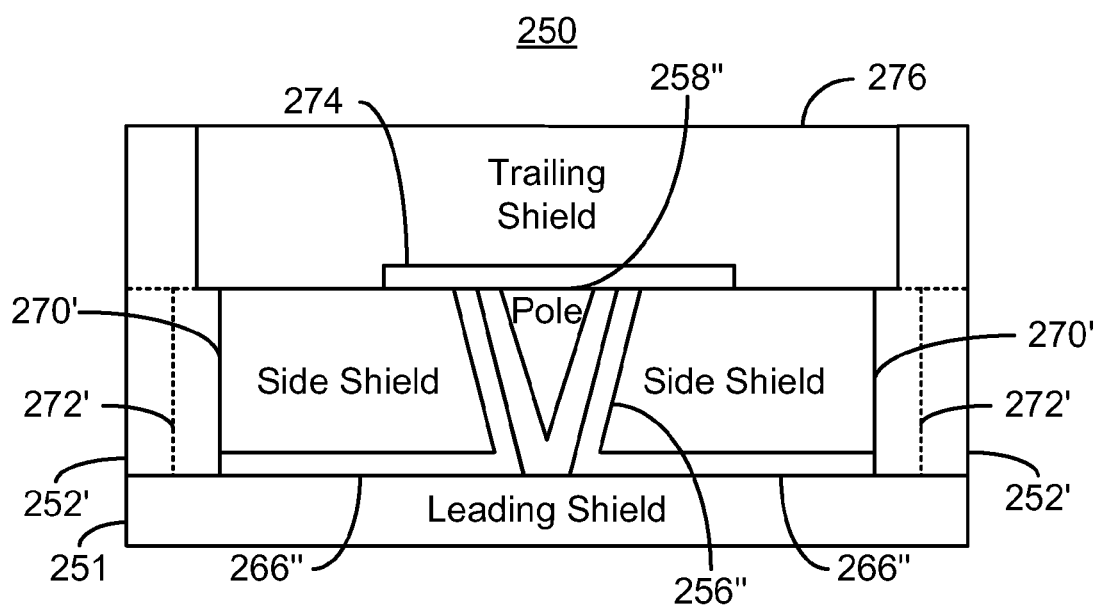

A write gap and trailing shield are formed, via step 234. In forming the write gap, a mill may be performed that removes portions of the side shield 270', side shield seed layer 266", pole 258" and 256". The write gap may be formed by atomic layer deposition of a nonmagnetic material such as aluminum oxide. At least part of the write gap is formed on the pole 258". The trailing shield may be formed by plating a magnetic material such as NiFe. At least part of the trailing shield is on the write gap. FIG. 24 depicts an ABS view of the transducer 250 after the write gap 274 is formed in step 234. FIG. 25 depicts an ABS view of the transducer 250 after the trailing shield 276 is formed. In the embodiment shown, the trailing shield 276 is magnetically and physically connected with the side shields 270'. In other embodiments, the write gap 274 may be extended so that the trailing shield 276 and side shields 270' are physically and magnetically disconnected.

Thus, using the method 200, the transducer 250 may be fabricated. The transducer 250 shares the benefits of the transducer 150. More specifically, fabrication and performance of the transducer 250 may be improved.

We claim:

1. A method for fabricating a magnetic writer having an air-bearing surface location (ABS location) corresponding to an air-bearing surface (ABS) and including a nonmagnetic layer, the method comprising:
   providing a pole trench in the nonmagnetic layer, the pole trench having a pole tip region and a yoke region;
   providing at least one pole material, the at least one pole material having an external protrusion above and external to the pole trench;
   providing a hard mask, the hard mask covering at least the external protrusion;
   removing a portion of the nonmagnetic layer adjacent to the pole trench to form a side shield trench;
   providing at least one side shield material, a portion of the at least one side shield material being adjacent to the hard mask and filling at least a portion of the side shield trench; and
   planarizing the at least one side shield material and the at least one pole material, thereby removing at least a portion of the external protrusion of the at least one pole material, removing a portion of the at least one side shield material and forming at least one side shield and a main pole.

2. The method of claim 1 wherein the step of providing the at least one main pole material further includes:
   depositing at least one pole seed layer;
   full film depositing the at least one pole layer;
   providing a mask, the mask covering a portion of the at least one pole layer corresponding to the at least one pole material and exposing a remaining portion of the at least one pole layer; and
   removing the remaining portion of the at least one pole layer.

3. The method of claim 1 wherein the step of providing the hard mask further includes:
   full film depositing a hard mask layer;
   providing a mask covering at a first portion of the hard mask layer corresponding to the hard mask and exposing a second portion of the hard mask layer; and
   removing the second portion of the hard mask layer.

4. The method of claim 3 wherein the hard mask layer includes Ru.

5. The method of claim 1 wherein the step of removing the portion of the nonmagnetic layer further includes:
   providing a mask covering the hard mask and exposing the portion of the nonmagnetic layer; and
   wet etching the portion of the nonmagnetic layer.

6. The method of claim 1 wherein the step of providing the at least one side shield material further includes:
   depositing at least one side shield seed layer;
   providing a side shield mask exposing at least a portion of the side shield trench, the hard mask and the external protrusion;
   depositing at least one side shield layer; and
   removing the side shield mask, the at least one side shield material remaining.

7. The method of claim 1 wherein the step of planarizing the at least one side shield material and the at least one pole material further includes:
   depositing a dielectric layer, the dielectric layer covering the at least one side shield material; and
   chemical mechanical planarizing the at least one side shield material and the at least one pole material.

8. The method of claim 1 wherein the at least one side shield material includes NiFe.

9. The method of claim 1 wherein the at least one pole material includes CoFe.

10. The method of claim 1 further comprising:
    providing a write gap, at least a portion of the write gap being on the pole; and
    providing a trailing shield, at least a portion of the trailing shield being on the write gap.

11. The method of claim 1 wherein the step of providing the at least one side shield material further includes
    providing a side shield mask exposing a portion of the magnetic transducer including the hard mask, the external protrusion of the pole material and the at least the portion of the side shield trench; and
    depositing at least one side shield layer after the side shield mask is provided; the method further including
    providing a write gap, at least a portion of the write gap being on the pole; and
    providing a trailing shield, at least a portion of the trailing shield being on the write gap.

12. A method for fabricating a magnetic transducer having an air-bearing surface location (ABS location) corresponding to an air-bearing surface (ABS) and including a nonmagnetic layer, the method comprising:
    providing a pole trench in the nonmagnetic layer, the pole trench having a pole tip region and a yoke region;
    full film depositing a nonmagnetic seed layer, a portion of the at least one nonmagnetic seed layer residing in the pole trench;
    full film depositing a pole layer, a first portion of the pole layer residing in and above the pole trench;
    providing a pole mask, the pole mask covering at least the portion of the pole layer and exposing a remaining portion of the pole layer;
    removing the remaining portion of the pole layer, the portion of the pole layer having an external protrusion above and external to the pole trench;
    full film depositing a hard mask layer, a portion of the hard mask layer covering the external protrusion, the hard mask layer consisting of Ru;
    providing a mask covering at least the portion of the hard mask layer;
    removing an exposed portion of the hard mask layer to form a hard mask, the hard mask covering at least the external protrusion;
    providing an etch mask covering the hard mask and exposing a portion of the nonmagnetic layer adjacent to the pole trench;
    wet etching the portion of the nonmagnetic layer, thereby forming a side shield trench;
    depositing a side shield seed layer;
    providing a side shield mask exposing a portion of the magnetic transducer including the hard mask, the portion of the pole layer and at least a portion of the side shield trench;
    depositing a side shield layer;
    removing the side shield mask;

depositing an aluminum oxide layer on a remaining portion of the side shield layer;

planarizing the side shield layer and at least a portion of the external protrusion, forming at least one side shield and a main pole;

providing a write gap, at least a portion of the write gap being on the pole; and providing a trailing shield, at least a portion of the trailing shield being on the write gap.

* * * * *